United States Patent
Tamai et al.

(10) Patent No.: US 9,068,645 B2
(45) Date of Patent: Jun. 30, 2015

(54) TRANSMISSION SUMP LEVEL CONTROL SYSTEM

(71) Applicant: GM Global Technology Operations LLC, Detroit, MI (US)

(72) Inventors: Goro Tamai, West Bloomfield, MI (US); Norman Schoenek, Novi, MI (US); Anthony J. Corsetti, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 13/767,909

(22) Filed: Feb. 15, 2013

(65) Prior Publication Data
US 2014/0172250 A1    Jun. 19, 2014

Related U.S. Application Data

(60) Provisional application No. 61/737,348, filed on Dec. 14, 2012.

(51) Int. Cl.
   G06F 7/00      (2006.01)
   F16H 57/04    (2010.01)

(52) U.S. Cl.
   CPC ......... *F16H 57/0447* (2013.01); *Y10S 903/902* (2013.01); *F16H 57/0413* (2013.01); *F16H 57/0442* (2013.01); *F16H 57/0443* (2013.01); *F16H 57/045* (2013.01); *F16H 57/0457* (2013.01); *F16H 57/0476* (2013.01)

(58) Field of Classification Search
   CPC ............ F16H 57/0447; F16H 57/0413; F16H 57/0476; F16H 57/0443; F16H 57/045; F16H 57/0457; F16H 57/0442; Y10S 903/902
   See application file for complete search history.

(56) References Cited

U.S. PATENT DOCUMENTS

| | | | | |
|---|---|---|---|---|
| 6,299,561 | B1 * | 10/2001 | Kramer et al. | 475/160 |
| 2008/0169030 | A1 * | 7/2008 | Schoenek et al. | 137/434 |
| 2008/0234915 | A1 * | 9/2008 | Nomasa et al. | 701/102 |
| 2013/0074630 | A1 * | 3/2013 | Jarvinen et al. | 74/467 |
| 2014/0048354 | A1 * | 2/2014 | Kolekar et al. | 184/6.12 |
| 2014/0243137 | A1 * | 8/2014 | Kwasniewski et al. | 475/160 |

* cited by examiner

*Primary Examiner* — David D Le
(74) *Attorney, Agent, or Firm* — Quinn Law Group, PLLC

(57) ABSTRACT

A method of controlling a level of fluid in a main sump of a transmission includes opening an auxiliary reservoir with a first valve when fluid temperature in the main sump is at or below the predetermined temperature. The first valve is opened to increase the level of fluid in the main sump to at least a predetermined height so that transmission rotating components contact the fluid and generate splash lubrication. When the transmission is transmitting torque and the fluid is above the predetermined temperature, the level of fluid in the main sump is maintained below a predetermined height with closed first valve, such that the rotating components do not contact the fluid inside the main sump. A fluid pump alone is sufficient to lubricate the rotating components above the predetermined temperature and sufficient to lubricate the rotating components at or below the predetermined temperature only with splash lubrication.

20 Claims, 3 Drawing Sheets

TRANSMISSION SUMP LEVEL CONTROL SYSTEM

CROSS-REFERENCE TO RELATED APPLICATIONS

This application claims the benefit of U.S. Provisional Patent Application No. 61/737,348 filed on Dec. 14, 2012, which is hereby incorporated by reference in its entirety.

TECHNICAL FIELD

The disclosure relates to a valve assembly operable to regulate the level of fluid within a sump volume defined by a transmission for a vehicle.

BACKGROUND

The flow of oil or fluid within a vehicle transmission is controlled in a manner to lubricate moving components contained therein and to actuate various subsystems, such as clutches, when needed. A transmission assembly typically includes a sump volume configured to store such fluid, as well as provide desired amounts of the fluid to various components and subsystems within the transmission.

The sump volume must contain a sufficient amount of fluid to maintain an inlet to a hydraulic pump submerged and account for fluid in transit between operational components of the transmission and the main sump volume. That is, for example, fluid directed to the lubrication circuit becomes fluid in transit, i.e., flowing inside the transmission, once the transmission is put in operation thereby reducing the level or amount of fluid contained within the main sump volume. Thus, the initial sump fill must be at a sufficient level to account for the fluid in transit, while maintaining the inlet of the hydraulic pump covered or submerged at all times.

Compared with elevated temperatures, at cold temperatures volume of fluid in transit inside the transmission is very large due to the fluid's viscosity. As temperature increases, fluid volume in transit decreases as viscosity decreases, thereby increasing fluid level within the main sump volume.

SUMMARY

One aspect of the disclosure is directed to a method of controlling a level of fluid in a main sump of a transmission having a pump for controlling flow of the fluid inside the transmission. The method includes opening, via a controller, fluid communication between an auxiliary reservoir and the main sump by opening an active first valve when a temperature of the fluid inside the main sump is at or below a predetermined temperature. In response, a level of the fluid in the main sump increases to at least a predetermined height and rotating components of the transmission contact the fluid inside the main sump to generate splash lubrication of the rotating components.

The method also includes closing via the controller the auxiliary reservoir by closing the first valve when the transmission is transmitting torque and the fluid is above the predetermined temperature. As a result, the level of the fluid in the main sump is maintained below a predetermined height and rotating components of the transmission do not contact the fluid inside the main sump.

The auxiliary reservoir is configured to hold at least a portion of the fluid and the first valve is configured to selectively open and close fluid communication between the main sump and the auxiliary reservoir. Furthermore, the pump alone is sufficient to lubricate the rotating components above the predetermined temperature and sufficient to lubricate the rotating components at or below the predetermined temperature only with the splash lubrication.

The transmission may be configured to transmit torque of a powerplant in a vehicle. The method may additionally include opening via the controller the first valve in response to a sensed activation of the powerplant to generate the splash lubrication.

The controller may be an electronic control unit (ECU) configured to regulate operation of the transmission and the powerplant.

The method may also include opening the first valve via the controller in response to an increasing amount of time that the transmission is not transmitting torque in combination with a decrease in the fluid temperature to generate the splash lubrication.

The controller may be programmed with a look-up table of elapsed time the powerplant is not active versus ambient temperature. In such a case, the method may additionally include opening the first valve via the controller in response to a value generated by the look-up table corresponding to the level of the fluid in the main sump having decreased to at least the predetermined height.

The method may also include sensing an impaired operation of the pump and generating the splash lubrication by opening the first valve via the controller in response to the sensed impaired operation of the pump.

The method may also include sensing g-forces affecting the fluid and opening the first valve via the controller in response to the sensed g-forces to generate the splash lubrication.

The transmission may additionally include a thermal second valve configured to passively control the level of the fluid inside the main sump according to the temperature of the fluid. In such a case, the method may further include regulating operation of the first valve via the controller in coordination with the second valve via an algorithm programmed into the controller.

The vehicle may be a hybrid-electric type, while the powerplant may include a motor-generator housed inside the transmission, and the auxiliary reservoir defines an overflow port configured to discharge overflow fluid. In such a case, the method may additionally include controlling release of the fluid from the auxiliary reservoir to the main sump solely through the first valve, such that, when the first valve is closed, the overflow port discharges and directs the fluid from the auxiliary reservoir to cool the motor-generator.

The auxiliary reservoir may be housed inside the transmission.

Another aspect of the disclosure is directed to a vehicle having a powerplant and a transmission with the main sump, the auxiliary reservoir, and the active first valve regulated via the controller is also disclosed.

The above features and advantages, and other features and advantages of the present disclosure, will be readily apparent from the following detailed description of the many aspects of the present disclosure when taken in connection with the accompanying drawings and appended claims.

DETAILED DESCRIPTION

Figure 1:
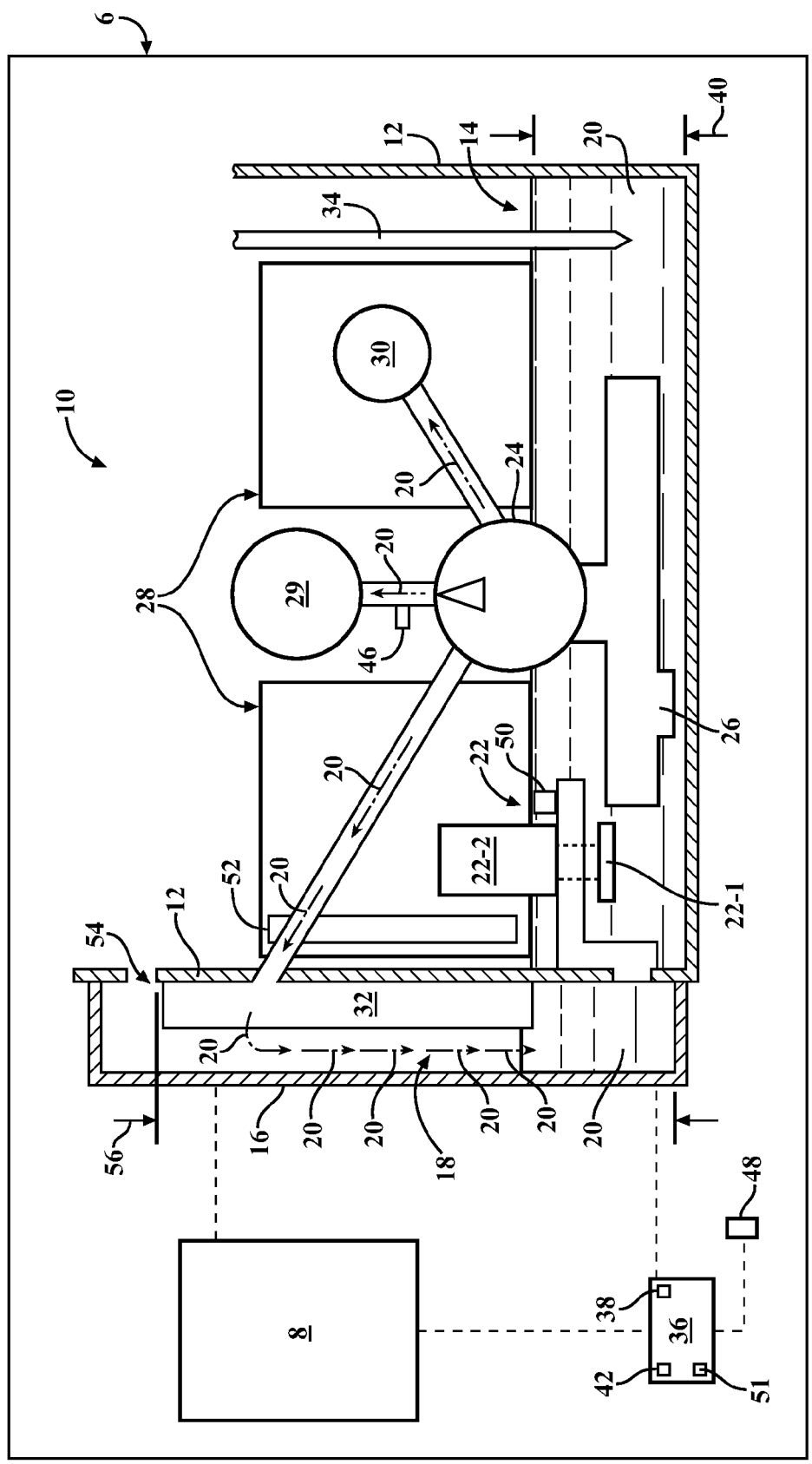
FIG. 1 is a schematic sectional view of a transmission for a vehicle, illustrating a valve assembly, consistent with the present disclosure, in a fully open position.

Referring to the drawings wherein like reference numbers correspond to like or similar components throughout the several figures, there is schematically depicted in FIG. 1 a vehicle 6. The vehicle 6 includes a powerplant 8, such as an internal combustion engine that is configured to generate torque to propel the vehicle. As shown, the powerplant 8 is operatively connected to a transmission 10, wherein the transmission is configured to transmit torque of the powerplant. The transmission 10 may be configured as an electrically variable transmission (EVT) for an electric or a hybrid-electric vehicle, or an automatically shiftable transmission.

FIG. 1 depicts a portion of the transmission 10 that provides multiple speed ranges and is configured to shift automatically between those speed ranges during operation of the vehicle 6. The transmission 10 includes a transmission case 12, which at least partially defines a main sump 14 having a predefined main sump volume. A side cover 16 is removably mounted to the transmission case 12. The side cover 16 and the transmission case 12 cooperate to define an auxiliary reservoir 18 having a predefined auxiliary volume, such that the auxiliary reservoir is housed inside the transmission 10. Each of the main sump 14 and the auxiliary reservoir 18 is configured to contain specially formulated oil or fluid 20 and are in selective fluid communication with each other through an active first valve 22. As employed herein, the term "active" denotes a valve that is controlled based on some predetermined parameters via an external device, such as an electronic controller.

Figure 2:
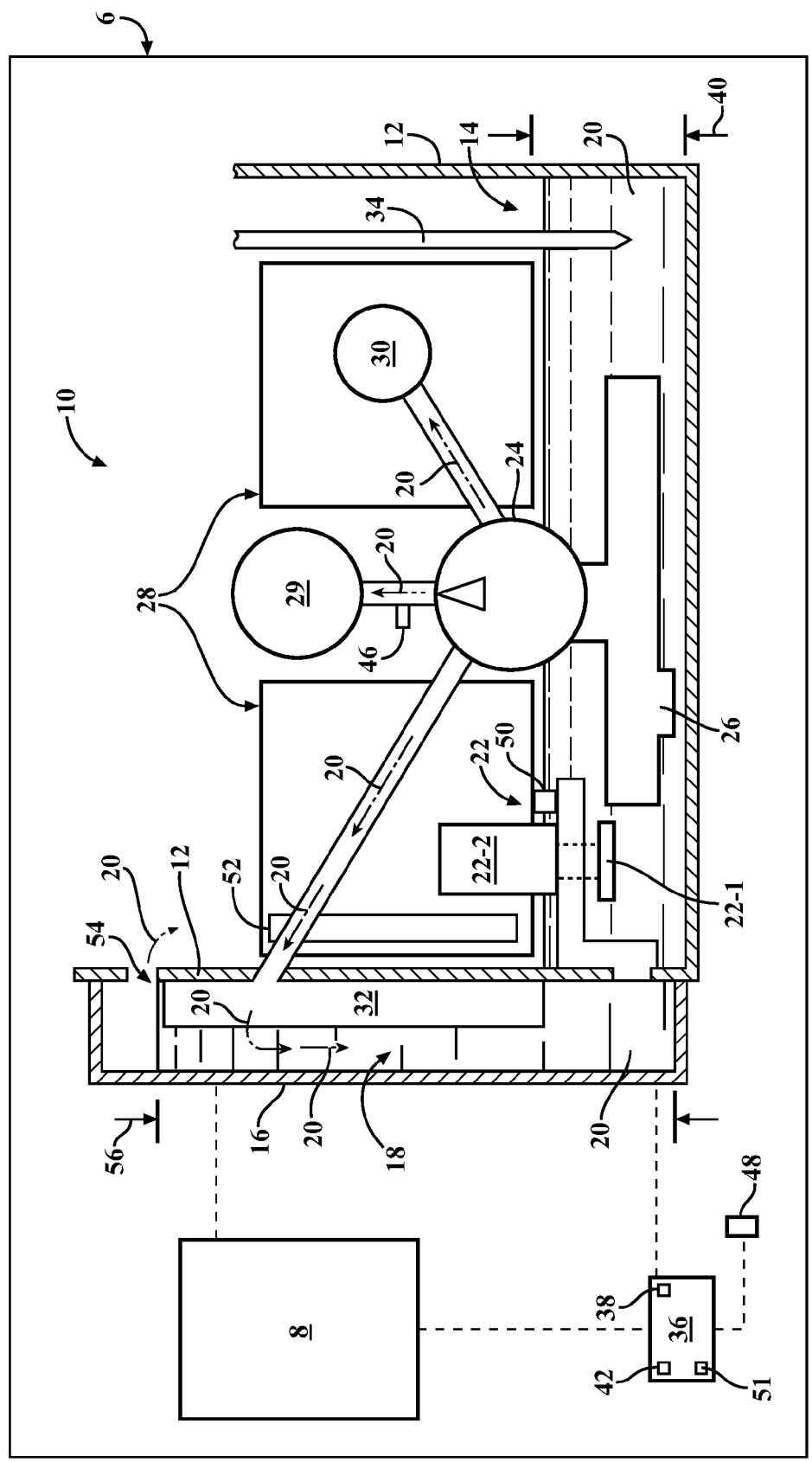
FIG. 2 is a schematic sectional view of the transmission of FIG. 1 illustrating the valve assembly in a fully closed position.

The valve 22 may be an electrically operated valve, for example via a solenoid (not shown), or a valve having a float member, as shown in FIGS. 1 and 2. As shown, the first valve 22 includes a valve member 22-1 and a float member 22-2 operatively connected thereto. In the case that the valve 22 is a float type of a valve, the float member 22-2 may be connected to the valve member 22-1 mechanically (such as through a mechanical linkage) or electrically (such as through a solenoid controlled valve actuator). The valve member 22-1 is shown in FIG. 1 as a tulip type valve; however, those skilled in the art of valve design will appreciate that other types of valves may be used while remaining within the scope of that which is claimed. The valve member 22-1 is movable between a fully open position, as shown in FIG. 1, and a fully closed position, as shown in FIG. 2.

A positive displacement hydraulic pump 24, having an inlet 26 mounted thereto, is operable to draw fluid 20 from the main sump 14 and communicate the fluid 20, under pressure, throughout the transmission 10. The hydraulic pump 24 is operable to provide a portion of fluid 20 to various transmission sub-systems, such as rotating components 28 that are generally part of the transmission gear-train, and a heat exchanger (not shown), such that the subject portion of fluid 20 is considered fluid in transit 29. Additionally, the hydraulic pump 24 is operable to provide fluid 20 to a fixed volume 30, such as the portion of fluid 20 required to maintain engagement of various clutches, not shown, within the transmission 10.

Optionally, as shown in FIGS. 1 and 2, in the case that the transmission 10 is an automatically shiftable unit, the transmission may employ a valve body 32 configured to control transmission gear changes. Furthermore, in such a case, the hydraulic pump 24 may be operable to communicate fluid 20, under pressure, to the valve body 32. Those skilled in the art will recognize that the valve body 32 is operable to selectively direct fluid 20 to various components within the transmission 10, such as to control the selective engagement and disengagement of the above-noted clutches (not shown). During operation of the transmission 10, the valve body 32 exhausts an amount of fluid 20 into the auxiliary reservoir 18, as indicated by arrows. As shown, a fluid level indicator or sensor 34 may be provided as a means to determine if the amount of fluid 20 contained within the transmission 10 is at an acceptable level. Advantageously, the transmission 10 does not require the auxiliary reservoir 18 to be filled with fluid 20 prior to setting the appropriate level of fluid 20 during the filling of the transmission 10.

During operation, with cool fluid 20, the volume of fluid in transit 29 inside the transmission 10 is large. Therefore, a low level of fluid 20 remains in the main sump 20 as shown in FIG. 1. To avoid starvation of the hydraulic pump 24, and the damage to the transmission 10 that may result, the inlet 26 must remain submerged within the fluid 20. As such, it may be desirable to compensate for the low fluid level in the main sump 14 by discharging an amount of fluid 20 contained within the auxiliary reservoir 18 into the main sump by opening the valve 22. Therefore, the fluid 20 entering the auxiliary reservoir 18 from the valve body 32 is allowed to pass to the main sump 14 through first valve 22. In this state of operation, the amount of fluid 20 entering the auxiliary reservoir 18 is less than that allowed to pass to the main sump 14; therefore, no accumulation of fluid 20 within the auxiliary reservoir 18 will occur.

Referring now to FIG. 2, there is shown the transmission 10 of FIG. 1 during operation with warm fluid 20. As is known to those skilled in the art of transmission design, the fluid 20 will expand with increasing temperature. Additionally, the volume of the fluid in transit 29 will be reduced as the viscosity of the fluid 20 decreases. Therefore, the volume of fluid 20 within the main sump 14 will increase to a level at which the first valve 22 will be closed. In the case that the first valve 22 is a float valve, the float member 22-2 will be buoyed by the fluid 20. Accordingly, the float member 22-2 will tend to move the valve member 22-1 from the open position, shown in FIG. 1, toward the closed position of FIG. 2. In doing so, the valve member 22-1 will increasingly and variably restrict the flow of fluid 20 between the auxiliary reservoir 18 and the main sump 14 until the valve member 22-1 is in the fully closed position, thereby blocking or preventing communication of fluid 20 between the auxiliary reservoir 18 and the main sump 14. By allowing the accumulation of fluid 20 within the auxiliary reservoir 18, the volume of fluid 20 within the main sump 14 can be maintained at a preferred level. Therefore, when temperature of the transmission 10 is in some predetermined operating range, spin losses and resultant decreases in efficiency may be reduced by maintaining the level of fluid 20 in the main sump 14 within preferred levels.

The vehicle 6 also includes a controller 36 that is configured to regulate operation of the transmission 10, and can also be configured to regulate operation of the powerplant 8. Accordingly, the controller may be an electronic control unit (ECU) configured to simultaneously regulate operation of the transmission 10 and the powerplant 8. The controller 36 is additionally programmed with a predetermined temperature 38 to regulate operation of the first valve 22 in response to the temperature of fluid 20 in the main sump 14. The controller 36 closes the first valve 22, such that, when the transmission 10 is transmitting the torque of the powerplant 8 and the body of fluid 20 in the main sump 14 is above the predetermined temperature 38, the level of the fluid in the main sump is maintained below a predetermined height 40. The predetermined height 40 may be established empirically during validation and testing of the transmission 10 to ensure that the rotating components 28 of the transmission do not contact the fluid 20 inside the main sump 14 during specific operating regimes of the transmission.

Additionally, the controller 36 opens the first valve 22 when the fluid temperature is at or below the predetermined temperature 38, such that the level of the fluid 20 in the main sump 14 increases to at least the predetermined height 40. Such an increased level of the fluid 20 in the main sump 14 will cause the rotating components 28 to contact the fluid inside the main sump to generate splash lubrication of the rotating components 28. During normal transmission operating conditions, wherein fluid temperature is above the predetermined temperature 38 value, the pump 24 alone is sufficient to lubricate the rotating components 28. However, during transmission operating conditions wherein fluid temperature is at or below the predetermined temperature 38 value, the pump 24 is sufficient to lubricate the rotating components 28 only with the splash lubrication.

The controller 36 may be additionally programmed to open first valve 22 in response to a sensed activation of the powerplant 8, such as during initial cold start of the engine to generate the splash lubrication. Such a controlled operation of the first valve 22 may be beneficial because during powerplant start-up the fluid temperature is likely to be at or below the predetermined temperature 38. The controller 36 may be additionally programmed to open the first valve 22 to generate the above-described splash lubrication in response to an increasing amount of time that the transmission 10 is not transmitting torque, and therefore not receiving thorough lubrication. The first valve 22 may also be opened to generate the splash lubrication, wherein the increasing amount of time that the transmission 10 is not transmitting torque takes place in combination with a decrease in temperature of the fluid 20, at least in part due to the rotating components not generating additional heat.

The controller 36 may be programmed with a look-up table 42 of elapsed time the powerplant 8 is not active at specific ambient temperature versus the resultant level of the fluid 20 inside the main sump 14. The look-up table 40 may be compiled based on data collected empirically during validation and testing of the transmission 10 that describes a correlation between the time the powerplant 8 is not active at specific ambient temperature and the resultant level of the fluid 20 in the main sump 14. In general, a greater elapsed time will result in a lower estimated level of fluid 20 within the main sump 14. The controller 36 may additionally be programmed to open the first valve 22 in response to a value generated by the look-up table 42 corresponding to the level of the fluid in the main sump 14 having decreased to at least the predetermined height 40. Thus, the look-up table 40 may be used to ensure that the rotating components 28 of the transmission 10 do not contact the fluid 20 inside the main sump 14 during specific operating regimes of the transmission, while permitting splash lubrication during other regimes of operation.

The vehicle 6 may additionally include a sensor 46 configured to sense an impaired or deficient operation of the pump 24. Furthermore, the controller 36 may be configured to generate the splash lubrication by opening the first valve 22 in response to the sensed impaired operation of the pump 24. The vehicle 6 may also include a sensor 48 configured to sense g-forces affecting the fluid, such as when the vehicle is negotiating a sustained turn sufficient to shift the fluid 20 to one side of the main sump 14. The controller 36 may be additionally programmed to generate the above-described splash lubrication by opening the first valve 22 in response to the sensed sustained g-forces.

The transmission may additionally include a thermal second valve 50 arranged in parallel with the first valve 22 with respect to the fluid communication path between the main sump 14 and the auxiliary reservoir 18. The second valve 50 may be configured to passively control the level of fluid 20 inside the main sump 14 according to the temperature of the fluid. Accordingly, when the temperature of the fluid 20 inside the main sump 14 has dropped below the predetermined temperature 38, the second valve 50 may open to allow additional fluid to enter the main sump from the auxiliary reservoir 18. The controller 36 may additionally be programmed to generate the splash lubrication by regulating operation of the first valve 22 in coordination with the second valve 50 via a dedicated algorithm 51 programmed into the controller. As noted above, the vehicle 6 may be a hybrid-electric type, wherein the powerplant 8 may additionally include a motor-generator 52 housed inside the transmission 10. The fluid 20 from the auxiliary reservoir 18 may be released to the main sump 14 solely through the first valve 22, such that, when the first valve is closed, an overflow port 54 defined by the auxiliary reservoir discharges and directs an overflow of the fluid 20 to cool the motor-generator 52. Other than for cooling the motor-generator 52, the overflow port 54 is generally configured to communicate fluid 20 from the auxiliary reservoir 18 to the main sump 14 if the level of fluid 20 within the auxiliary reservoir 18 reaches a predetermined height 56.

Figure 3:
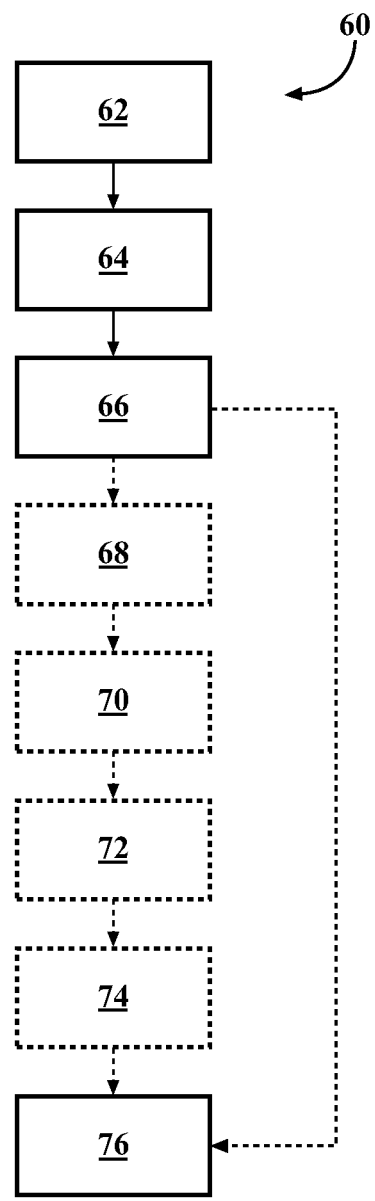
FIG. 3 is a flow chart illustrating a method of controlling a level of fluid in the main sump of the transmission shown in FIGS. 1 and 2.

FIG. 3 depicts a method 60 of controlling the level of fluid 20 in the main sump 14 of the transmission 10. The method commences in frame 62 with starting of the powerplant 8. Following frame 62, the method proceeds to frame 64, where it includes opening the first valve 22 via the controller 36 to commence fluid communication between the auxiliary reservoir 18 and the main sump 14. As disclosed above, such opening of the first valve 22 is intended to permit the fluid level in the main sump 14 to rise to at least the predetermined height 40 when the fluid 20 is at or below the predetermined temperature 38. The fluid level in the main sump 14 being maintained at or above the predetermined height 40 allows the rotating components 28 of the transmission 10 to contact the fluid 20 inside the main sump 14 and generate splash lubrication of the rotating components 28.

As described above, when fluid 20 is above the predetermined temperature 38, the pump 24 alone is sufficient to lubricate the rotating components 28. On the other hand, at or below the predetermined temperature 38, the pump 24 is sufficient to lubricate the rotating components 28 only in combination with the splash lubrication. Accordingly, the controller 36 may be programmed to open the first valve 22 in response to a sensed activation of the powerplant 8 to generate the splash lubrication.

After frame 64, the method advances to frame 66, where it includes closing via the controller 36 the auxiliary reservoir 18 by closing the first valve 22 when the transmission 10 is transmitting torque from the powerplant 8 and the fluid is above the predetermined temperature 38. As disclosed above, such closing of the first valve 22 is intended to maintain the level of the fluid 20 in the main sump 14 below the predetermined height 40 in order to keep the rotating components 28 of the transmission 10 from contacting the fluid 20 inside the main sump.

Following frame 66, the method may proceed to frame 68, where it includes opening the first valve 22 via the controller 36 in response to an increasing amount of time that the transmission 10 is not transmitting powerplant torque in combination with a decrease in the fluid temperature to generate the splash lubrication. After frame 68, the method may additionally proceed to frame 70, where it includes sensing an impaired operation of the pump 24 and generating the splash lubrication by opening the first valve 22 via the controller 36 in response to the sensed impaired operation of the pump.

Following frame 70, the method may additionally proceed to frame 72, where it includes sensing g-forces affecting the fluid 20 and opening the first valve 22 via the controller 36 in response to the sensed sustained g-forces to generate the splash lubrication. After frame 72, the method may additionally proceed to frame 74, where it includes regulating operation of the first valve 22 via the controller 36 in coordination with the second valve 50 via an algorithm programmed into the controller 36. After frame 72, the method may advance to frame 74, where it includes controlling fluid flow from the auxiliary reservoir 18 to the main sump 14 solely through the first valve 22. When the first valve is closed, such control of the fluid communication between the main sump 14 and the auxiliary reservoir 18 permits the overflow port 54 to discharge the fluid 20 from the auxiliary reservoir and direct the fluid to cool the motor-generator 52. The method may conclude in frame 76 either following frame 74 or directly following frame 66 when the powerplant 8 is shut off The detailed description and the drawings or figures are supportive and descriptive of the many aspects of the present disclosure. While certain aspects have been described in detail, various alternative aspects exist for practicing the invention as defined in the appended claims.

The invention claimed is:

1. A method of controlling a level of fluid in a main sump of a transmission having a pump for controlling flow of the fluid inside the transmission, the method comprising:
   opening via a controller fluid communication between an auxiliary reservoir and the main sump by opening an active first valve when a temperature of the fluid inside the main sump is at or below a predetermined temperature; and
   closing via the controller the auxiliary reservoir by closing the first valve, such that, when the transmission is transmitting torque and the fluid is above the predetermined temperature, the level of the fluid in the main sump is maintained below a predetermined height and rotating components of the transmission do not contact the fluid inside the main sump;
   wherein the opening of fluid communication between the auxiliary reservoir and the main sump causes a level of the fluid in the main sump to increase to at least the predetermined height;
   wherein the rotating components of the transmission contact the fluid inside the main sump to generate splash lubrication of the rotating components;
   wherein the auxiliary reservoir is configured to hold at least a portion of the fluid and the first valve is configured to selectively open and close fluid communication between the main sump and the auxiliary reservoir; and
   wherein the pump alone is sufficient to lubricate the rotating components above the predetermined temperature and sufficient to lubricate the rotating components at or below the predetermined temperature only with the splash lubrication.

2. The method according to claim 1, wherein the transmission is configured to transmit torque of a powerplant in a vehicle, the method further comprising opening via the controller the first valve in response to a sensed activation of the powerplant to generate the splash lubrication.

3. The method according to claim 2, wherein the controller is an electronic control unit (ECU) configured to regulate operation of the transmission and the powerplant.

4. The method according to claim 2, further comprising opening the first valve via the controller in response to an increasing amount of time that the transmission is not transmitting torque in combination with a decrease in the fluid temperature to generate the splash lubrication.

5. The method according to claim 2, wherein the controller is programmed with a look-up table of elapsed time the powerplant is not active versus ambient temperature, the method further comprising opening the first valve via the controller in response to a value generated by the look-up table corresponding to the level of the fluid in the main sump having decreased to at least the predetermined height.

6. The method according to claim 1, further comprising sensing an impaired operation of the pump and generating the splash lubrication by opening the first valve via the controller in response to the sensed impaired operation of the pump.

7. The method according to claim 1, further comprising sensing g-forces affecting the fluid and opening the first valve via the controller in response to the sensed g-forces to generate the splash lubrication.

8. The method according to claim 1, wherein the transmission additionally includes a thermal second valve configured to passively control the level of the fluid inside the main sump according to the temperature of the fluid, the method further comprising regulating operation of the first valve via the controller in coordination with the second valve.

9. The method according to claim 1, wherein:
   a vehicle is a hybrid-electric type;
   the powerplant includes a motor-generator housed inside the transmission;
   the auxiliary reservoir defines an overflow port configured to discharge overflow fluid; and
   further comprising controlling release of the fluid from the auxiliary reservoir to the main sump solely through the first valve, such that, when the first valve is closed, the overflow port discharges and directs the fluid from the auxiliary reservoir to cool the motor-generator.

10. The method according to claim 1, wherein the auxiliary reservoir is housed inside the transmission.

11. A vehicle comprising:
   a powerplant configured to generate torque;
   a transmission configured to transmit the powerplant torque to propel the vehicle;
   a main sump arranged inside the transmission and configured to hold a fluid;
   an auxiliary reservoir configured to hold at least a portion of the fluid;
   an active first valve configured to selectively open and close fluid communication between the main sump and the auxiliary reservoir;
   a pump configured to control flow of the fluid inside the transmission; and
   a controller programmed to:
      close the first valve, such that, when the transmission is transmitting the torque and the fluid inside the main sump is above a predetermined temperature, a level of the fluid in the main sump is maintained below a predetermined height and rotating components of the transmission do not contact the fluid inside the main sump; and open the first valve when the fluid temperature is at or below the predetermined temperature, such that the level of the fluid in the main sump increases to at least the predetermined height and the rotating components of the transmission contact the fluid inside the main sump to generate splash lubrication of the rotating components, and the pump alone is sufficient to lubricate the rotating components above the predetermined temperature and sufficient to lubricate the rotating components at or below the predetermined temperature only with the splash lubrication.

12. The vehicle according to claim 11, wherein the controller is additionally programmed to open the first valve in response to a sensed activation of the powerplant to generate the splash lubrication.

13. The vehicle according to claim 12, wherein the controller is an electronic control unit (ECU) programmed to regulate operation of the transmission and the powerplant.

14. The vehicle according to claim 12, wherein the controller is additionally programmed to open the first valve to generate the splash lubrication in response to an increasing amount of time that the transmission is not transmitting torque in combination with a decrease in the fluid temperature.

15. The vehicle according to claim 12, wherein the controller is programmed with a look-up table of elapsed time the powerplant is not active versus ambient temperature, the controller is additionally programmed to open the first valve in response to a value generated by the look-up table corresponding to the level of the fluid in the main sump having decreased to at least the predetermined height.

16. The vehicle according to claim 11, further comprising a sensor configured to sense an impaired operation of the pump, wherein the controller is additionally programmed to generate the splash lubrication by opening the first valve in response to the sensed impaired operation of the pump.

17. The vehicle according to claim 11, further comprising a sensor configured to sense g-forces affecting the fluid, wherein the controller is additionally programmed to generate the splash lubrication by opening the first valve in response to the sensed g-forces to generate the splash lubrication.

18. The vehicle according to claim 11, wherein the transmission additionally includes a thermal second valve configured to passively control the level of the fluid inside the main sump according to the temperature of the fluid, and the controller is additionally programmed to generate the splash lubrication by regulating operation of the first valve in coordination with the second valve.

19. The vehicle according to claim 11, wherein:

the vehicle is a hybrid-electric type;

the powerplant includes a motor-generator housed inside the transmission;

the auxiliary reservoir defines an overflow port configured to discharge overflow fluid; and the controller is additionally programmed to control release of the fluid from the auxiliary reservoir to the main sump solely through the first valve, such that, when the first valve is closed, the overflow port discharges and directs the fluid from the auxiliary reservoir to cool the motor-generator.

20. The vehicle according to claim 11, wherein the auxiliary reservoir is housed inside the transmission.

* * * * *